Aug. 18, 1925.
W. KNIPPEL
BEARING
Filed Jan. 11, 1923
1,550,265
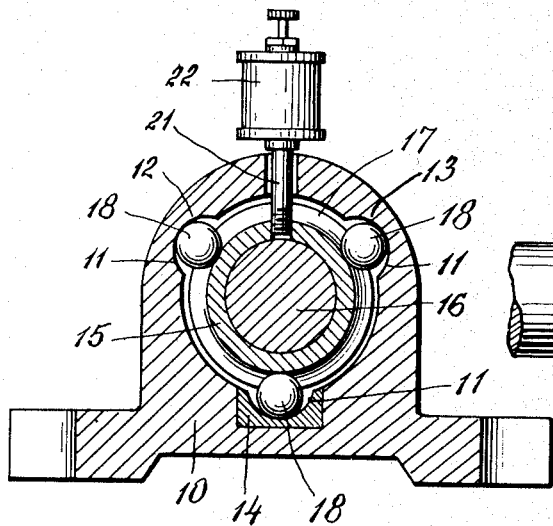
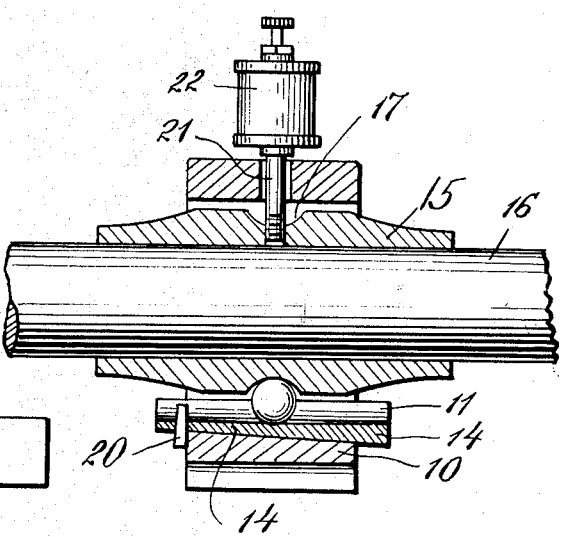
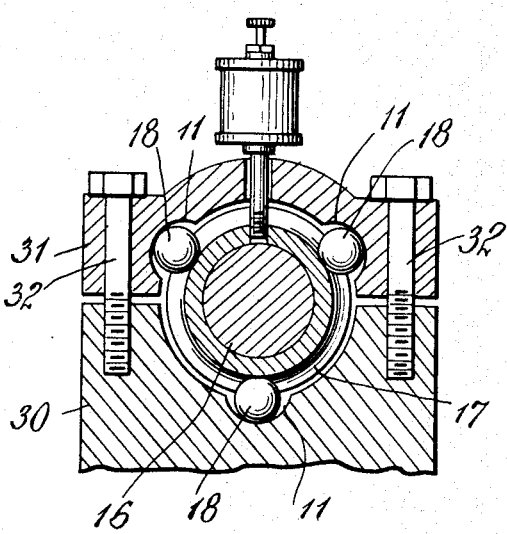
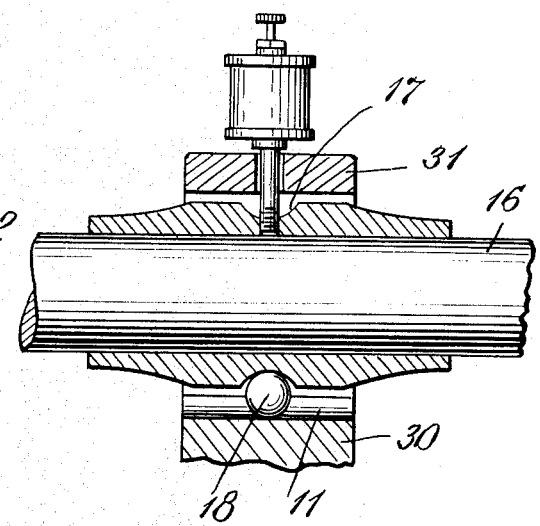
INVENTOR
Walter Knippel
BY E. W. Marshall
ATTORNEY Patented Aug. 18, 1925.

1,550,265

UNITED STATES PATENT OFFICE.

WALTER KNIPPEL, OF YONKERS, NEW YORK.

BEARING.

Application filed January 11, 1923. Serial No. 611,926.

*To all whom it may concern:*

Be it known that I, WALTER KNIPPEL, a citizen of the United States, and a resident of Yonkers, county of Westchester, and State of New York, have invented certain new and useful Improvements in Bearings, of which the following is a specification.

This invention relates to bearings. The cost of shaft bearings is very largely determined by the amount of machining required and this invention has for its salient object to provide a self-alining bearing so constructed and arranged as to require a minimum amount of machining.

Another object of the invention is to provide a bearing of the class described so constructed and arranged that the parts thereof can be readily assembled or taken apart.

Another object of the invention is to provide a bearing of the class described that is simple in construction, comprises few parts and can be economically manufactured.

Further objects of the invention will appear from the following specification taken in connection with the drawings, which form a part of this application and in which Fig. 1 is a transverse sectional elevation of one form of bearing constructed in accordance with the invention.

Fig. 2 is a longitudinal sectional elevation taken substantially at right angles to Fig. 1.

Fig. 3 is a view similar to Fig. 1, but showing another form of bearing constructed in accordance with the invention, and Fig. 4 is a sectional elevation similar to Fig. 2, but showing the bearing illustrated in Fig. 3.

The invention briefly described consists of a bearing comprising a bearing box, a bearing sleeve and a plurality of bearing members or supporting members, preferably spherical, securely clamped between the bearing box and sleeve. In the particular form of the invention shown, the bearing box is provided with a plurality of angularly displaced longitudinal grooves which receive the bearing members and the sleeve has formed therein an annular groove also receiving the bearing members or supports.

Further details of the invention will appear from the following description.

The embodiment of the invention illustrated in Figs. 1 and 2 consists of a bearing box 10 having a plurality of longitudinally extending grooves 11 formed therein. These grooves may be formed in the material of the bearing box as shown at 12 and 13 or may be formed in a separate strip of material as shown at 14. The strip 14 is preferably wedge-shaped as shown in Fig. 2 and may be driven in to clamp the bearing members in position as hereinafter described.

A bearing sleeve 15 is provided with a machined cylindrical inner surface for receiving the shaft 16 and the sleeve 15 has formed on its outer surface an annular groove 17. Spherical bearing or supporting members or balls 18 are mounted in the annular groove 17 and engage grooves 11 of the bearing box.

When the bearing shown in Figs. 1 and 2 is assembled, the balls 18 are placed in position between the grooves 11 of the bearing box and the groove 17 of the bearing sleeve. The shaft 16 is then properly alined and the wedge strip 14 is driven in to clamp the balls 18 firmly between the sleeve and bearing box. A wedge pin 20 is then inserted in a slot in the strip 14 to secure the strip in position.

In order to lubricate the bearing an oil conduit 21 is threaded into the sleeve and has an oil cup 22 secured to its outer end.

In the embodiment of the invention shown in Figs. 3 and 4 the bearing box is formed in two pieces 30 and 31, these pieces being clamped together by bolts 32.

The balls 18 are clamped in position between the grooves 11 formed in the bearing box and the annular groove 17 formed in the bearing sleeve. Attention is called to the fact that in both the embodiments of the invention the radius of curvature of the groove in the bearing sleeve and of the grooves in the bearing box is greater than the radius of curvature of the spherical bearing members 18. The purpose of this difference in curvature is to prevent any binding of the balls in the grooves.

Although certain specific embodiments of the invention have been shown and described it will be understood that the invention is capable of modification and that changes in the construction and in the arrangement of the various cooperating parts may be made without departing from the spirit or scope of the invention as expressed in the following claims.

What I claim is:

1. A bearing comprising a bearing box, a bearing sleeve in said box, a plurality of angularly displaced spherical members clamped between said sleeve and said box, and means including a wedge for clamping said members in position.

2. A bearing comprising a bearing box, a bearing sleeve in said box, a plurality of angularly displaced spherical members clamped between said sleeve and said box, and means including a wedge engaging one of said members for clamping said members in position.

3. A bearing comprising a bearing box, a bearing sleeve in said box, a plurality of angularly displaced spherical members clamped between said sleeve and said box, and means including a grooved wedge engaging one of said members for clamping said members in position.

In witness whereof, I have hereunto set my hand this 16 day of December, 1922.

WALTER KNIPPEL.